March 8, 1966     B. C. STAMBAUGH ETAL     3,238,545
APPARATUS FOR SHAPING SHOE UPPERS Filed Feb. 19, 1963     8 Sheets-Sheet 1

INVENTORS
Burnell C. Stambaugh
George E. Meckley by Robert U. Getty

Attorney

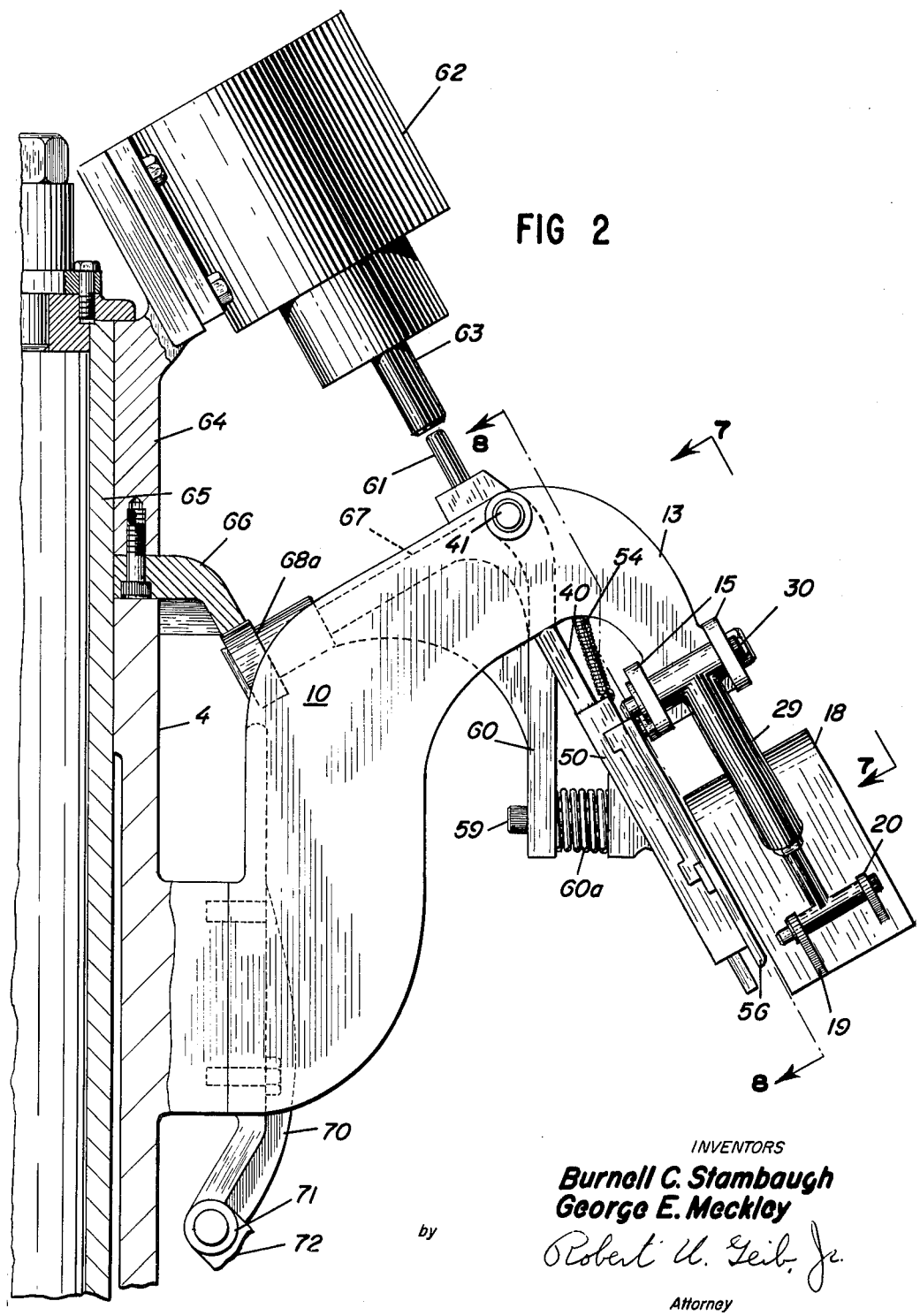

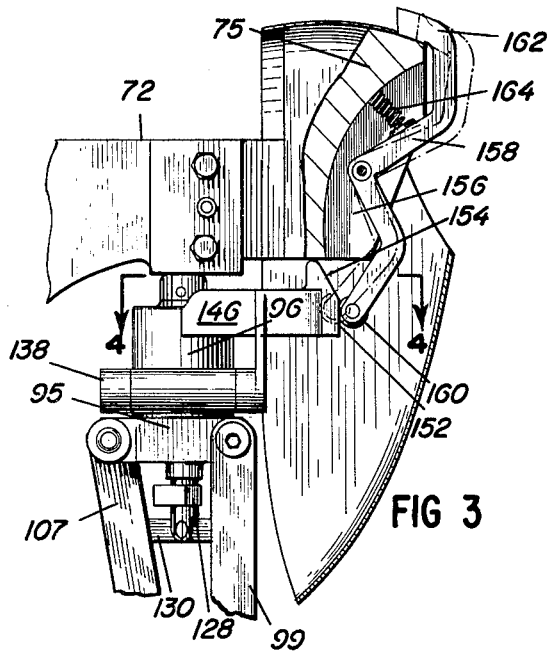
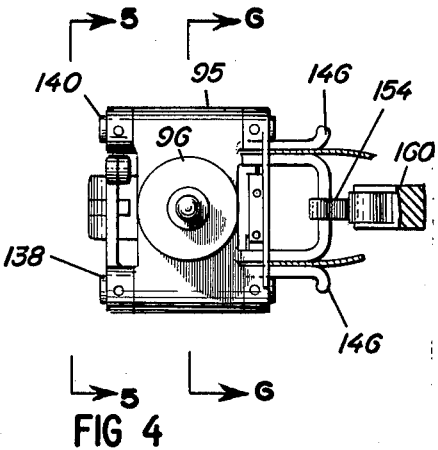
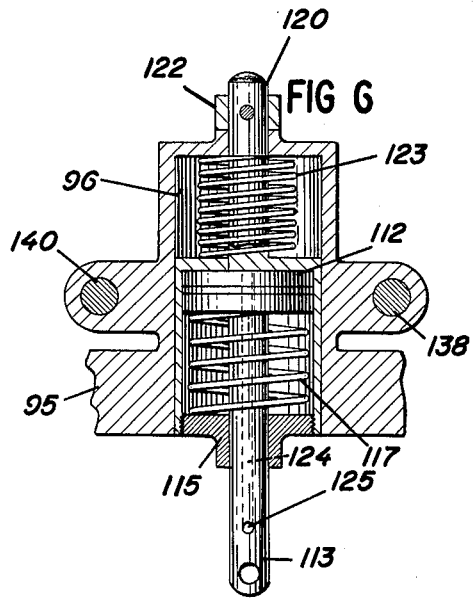
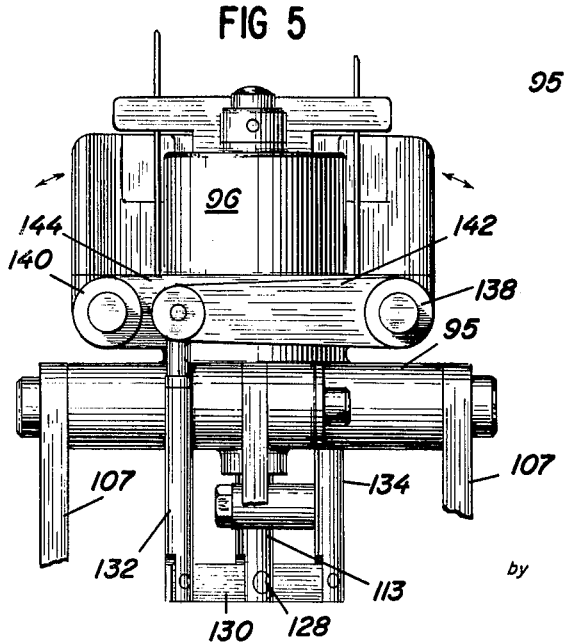
INVENTORS
*Burnell C. Stambaugh
George E. Meckley*

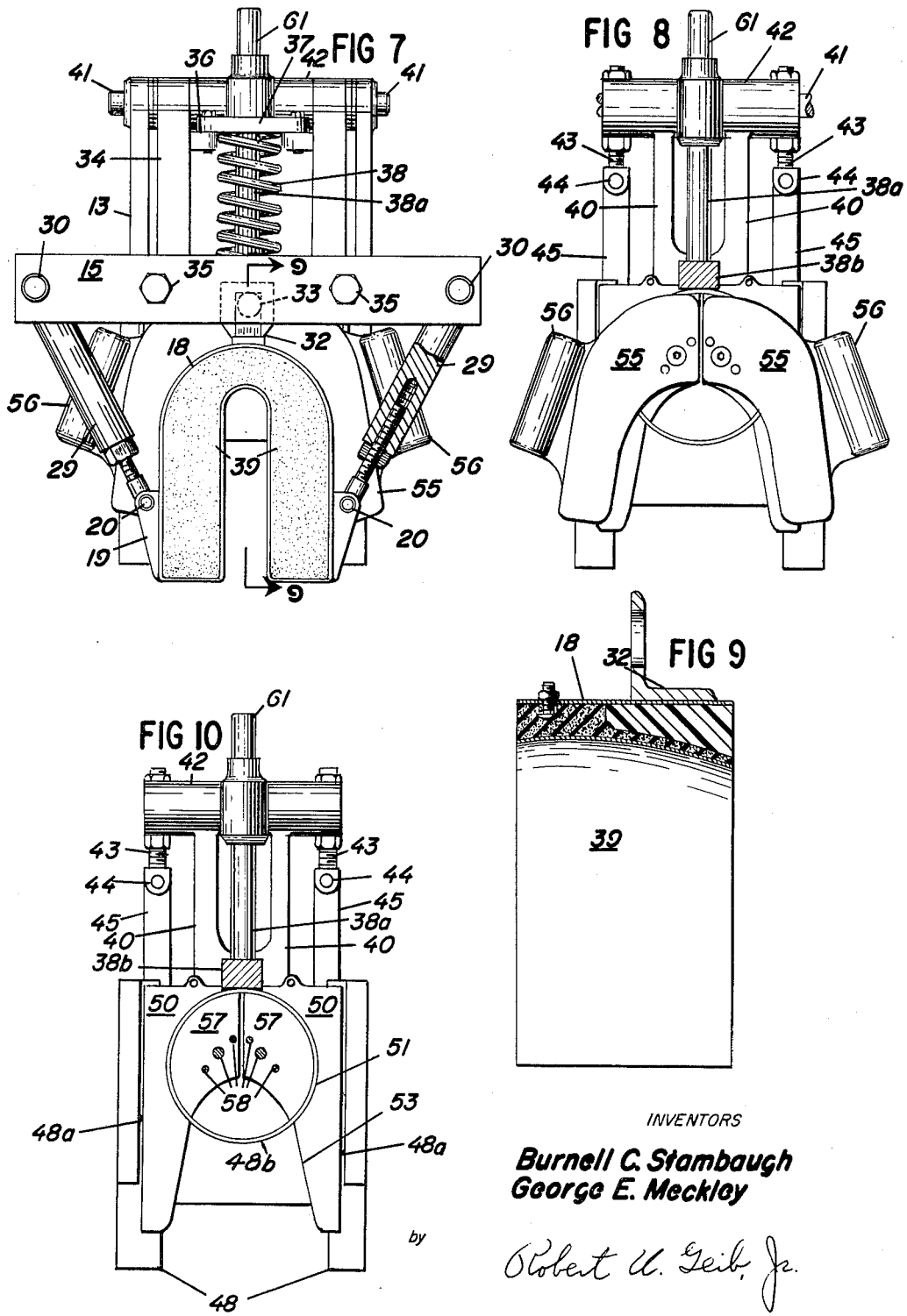

March 8, 1966 B. C. STAMBAUGH ETAL 3,238,545
APPARATUS FOR SHAPING SHOE UPPERS
Filed Feb. 19, 1963 8 Sheets-Sheet 5
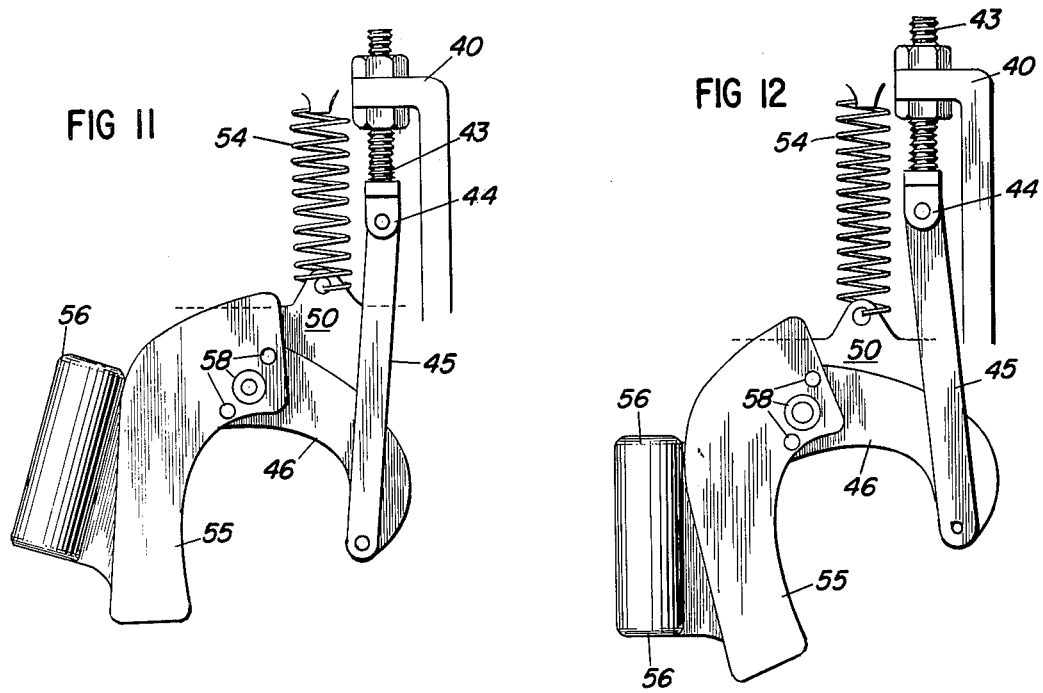
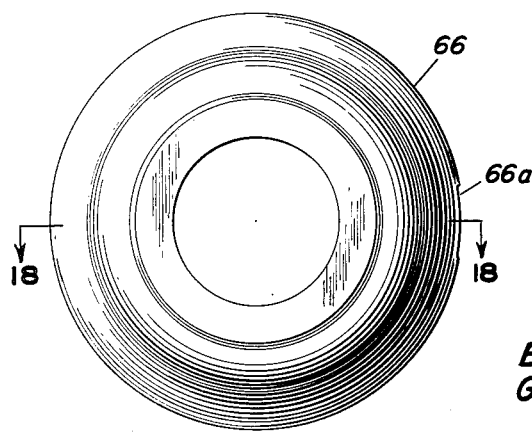
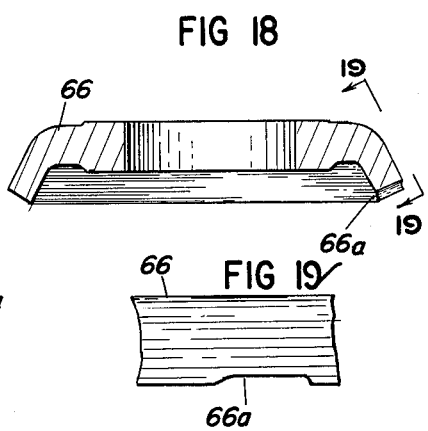
INVENTORS
**Burnell C. Stambaugh
George E. Meckley**
by Robert U. Geib, Jr.
Attorney INVENTORS
**Burnell C. Stambaugh
George E. Meckley**

March 8, 1966   B. C. STAMBAUGH ETAL   3,238,545
APPARATUS FOR SHAPING SHOE UPPERS
Filed Feb. 19, 1963   8 Sheets-Sheet 7

INVENTORS
**Burnell C. Stambaugh
George E. Meckley** by *Robert U. Geib, Jr.*

Attorney

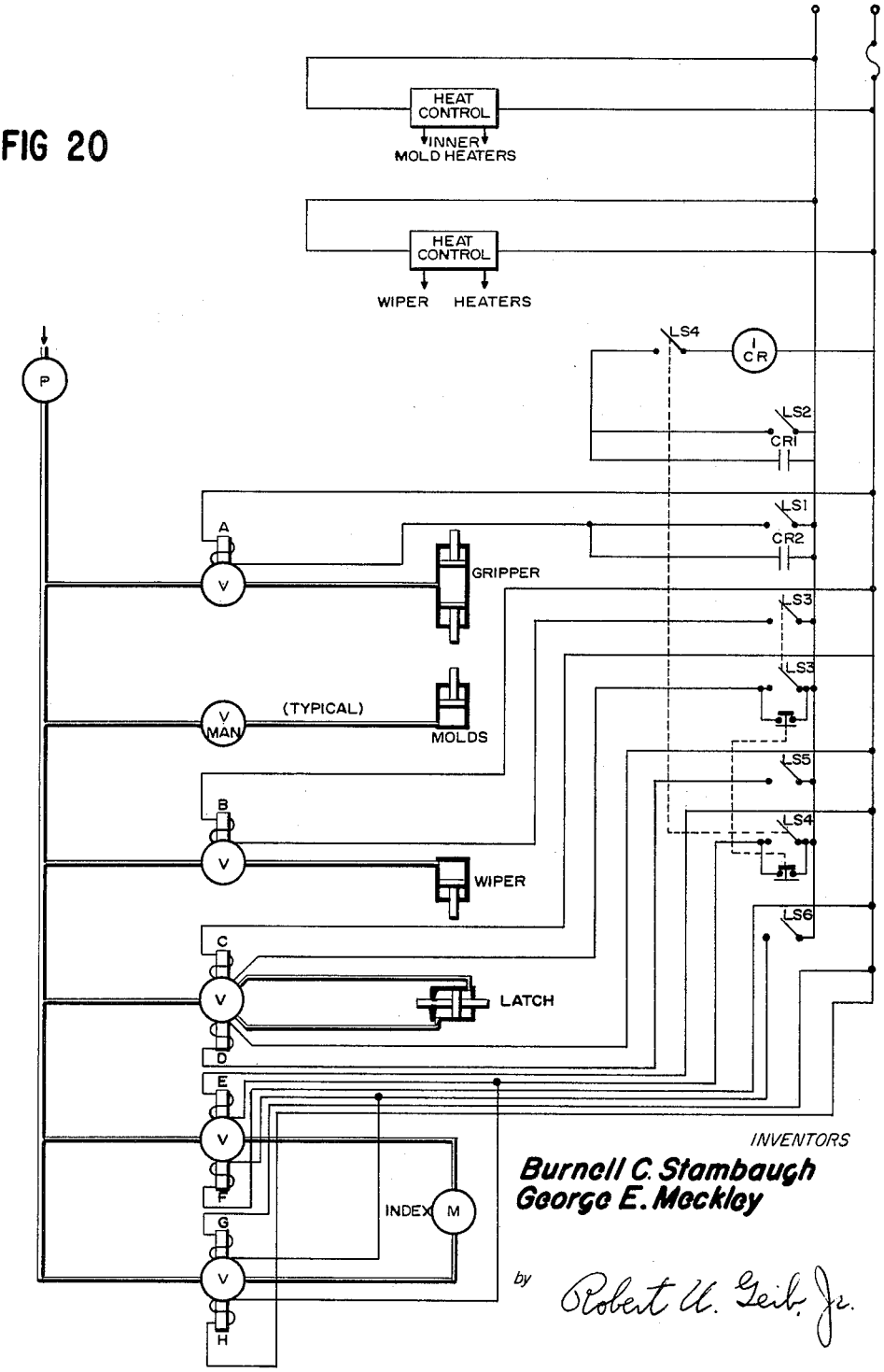

United States Patent Office 3,238,545
Patented Mar. 8, 1966

3,238,545
APPARATUS FOR SHAPING SHOE UPPERS
Burnell C. Stambaugh, Hanover, and George E. Meckley, Abbottstown, Pa., assignors to Automated Systems, Inc., Harrisburg, Pa., a corporation of Pennsylvania
Filed Feb. 19, 1963, Ser. No. 259,605
11 Claims. (Cl. 12—54.3)

This invention relates to shoe machinery, and particularly to apparatus for shaping the back portion of shoe uppers, including counters.

It is among the objects of the present invention to provide an apparatus of the class described which comprises improved means for effecting the sealing or joining of the component parts of the upper, including the turning inward of the otherwise projecting marginal flange of the blank.

Prior art apparatus of the class generally described may include a heel end form or inner mold element about which the (shoe upper) blank is positioned; an outer mold element which is expansible and contractable and movable about the heel end form (or inner mold element) to shape the blank to the contour of the external surface of the latter, and to hold the shaped shoe upper with a portion of its margin projecting from the heel end form. Also a pair of wiper blades having curved edges which conform to the contour of the sides of the heel end form; means pivotally supporting the wiper blades for closing movement about the heel form in a plane parallel thereto for folding the projecting marginal portion of the shaped shoe upper inwardly against the corresponding portion of the inner mold element. The aforementioned instrumentalities of the prior art are usually mounted on a carriage which carries the outer mold element and which is movable toward and away from the inner mold element (i.e. heel end form); power operable means being provided for effecting movement of the carriage and engagement and disengagement of the outer and inner mold elements as well as the aforementioned movement of the wiper blades.

The teachings of the prior art also include the mounting of several shaping assemblies of the type described immediately hereinbefore upon a rotary table so as to be movable in a predetermined path with reference to a place of loading and unloading. Thus, shoe upper blanks may be mounted successively on the several shaping assemblies as they move past the place of loading and be removed when they return to the place of loading, the period of time consumed during their movement from and to the place of loading being sufficient to permit setting under pressure and heat of the back part of the shoe upper blank.

It is among the objects of the present invention to provide an apparatus of the type generally described hereinbefore, but wherein novel combinations and subcombinations of elements function in highly improved manner.

Another object is the provision of an efficient apparatus of the class described which is simple and easy to operate and which is characterized by reduced production and maintenance costs.

Another object is to provide a machine for molding shoe uppers which while possessed of the characteristics recited immediately hereinbefore is capable of performing the desired molding operation on heavier shoes than are the comparable prior art machines of which we are aware.

With the foregoing objects in view, together with others which will appear as the description proceeds, the invention resides in the novel construction, combination and arrangement of parts, as will be described more fully hereinafter, illustrated in the drawings, and particularly pointed out in the claims.

In the drawings:

FIGURE 2 is a fragmentary elevation, partly in section, of a portion of the apparatus of FIGURE 1;

FIGURE 3 is a fragmentary elevation, partly in section, of an inner mold element, together with means for gaging the position of the (shoe upper) blank thereon and a portion of the means for gripping the blank in proper position;

FIGURE 4 is a view taken on the line 4—4 of FIGURE 3;

FIGURE 5 is an elevation on an enlarged scale which is taken on the line 5—5 of FIGURE 4;

FIGURE 6 is a fragmentary view, partly in section, which is taken on the line 6—6 of FIGURE 4 and on an enlarged scale;

Figure 13:
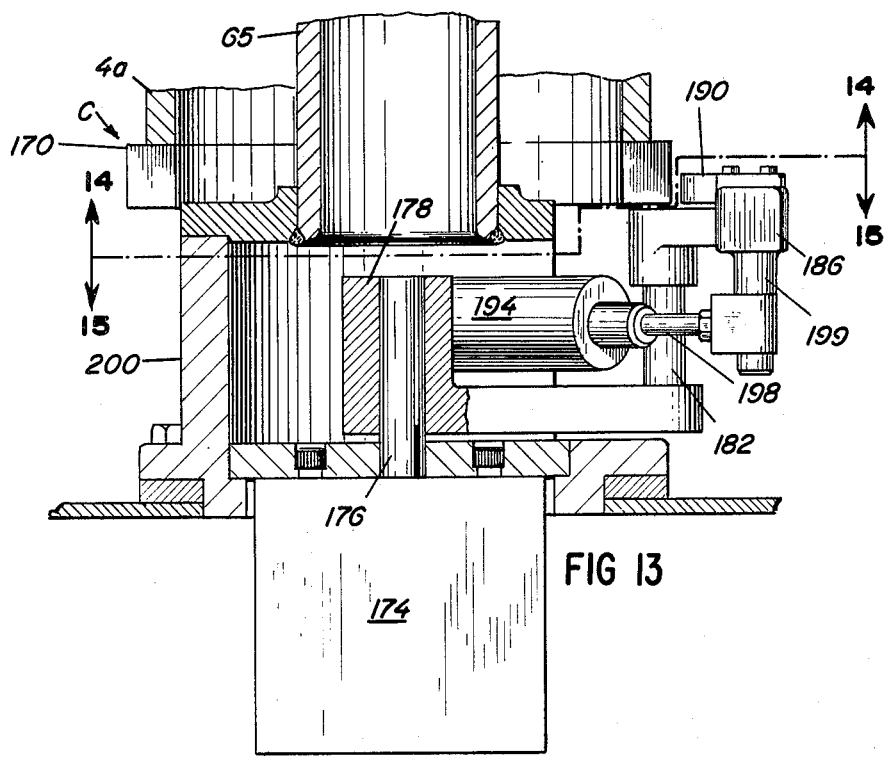
Figure 14:
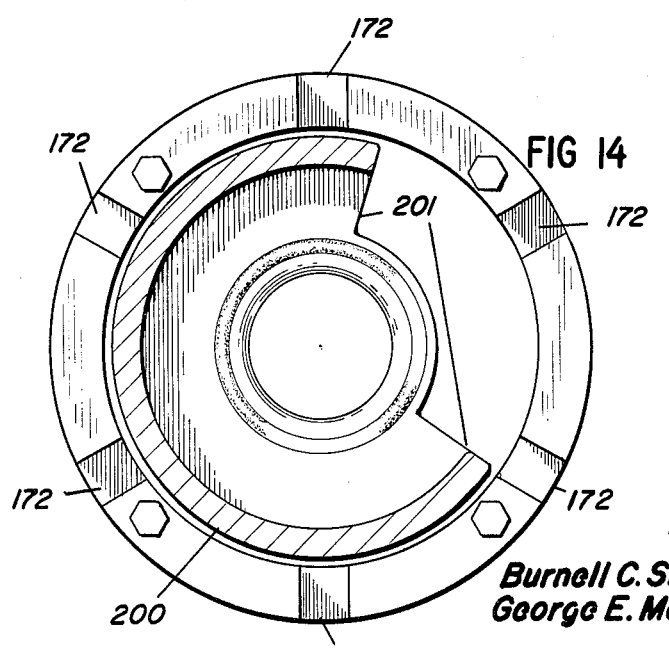
Figure 15:
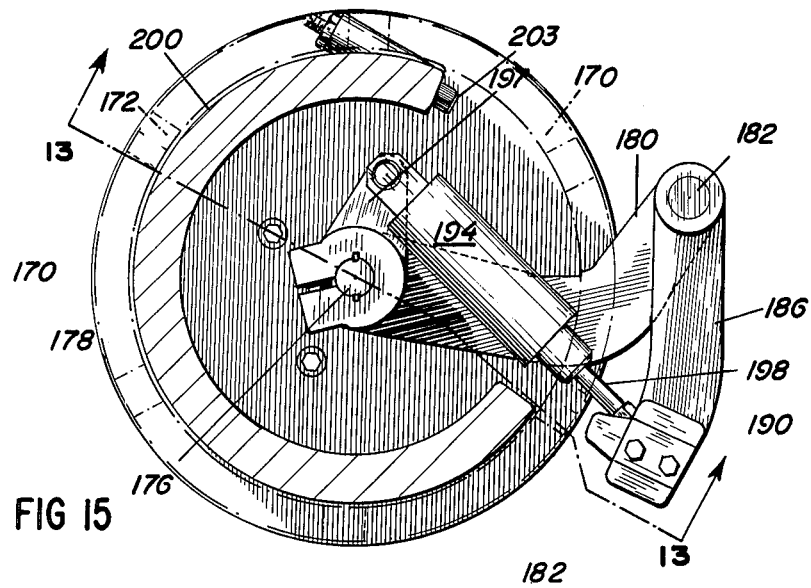
Figure 16:
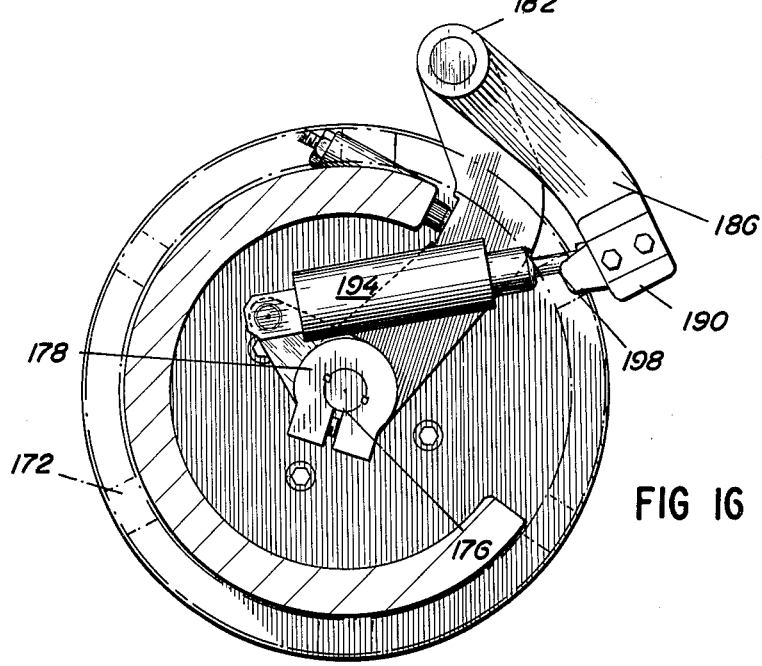

FIGURES 7 and 8 are elevational views which are taken on the lines 7—7 and 8—8, respectively, of FIGURE 2;

FIGURE 9 is a view taken on the line 9—9 of FIGURE 7 and illustrating on an enlarged scale one of the outer mold elements;

FIGURE 10 is a view similar to that of FIGURE 8 but with the wiper blades removed in order to better illustrate the operating means therefor;

FIGURES 11 and 12 are schematic elevational views illustrating the movement of the wiper blades into operative position;

FIGURE 13 is a fragmentary elevation illustrating the lower portion of the apparatus and the driving mechanism which moves a series of inner and outer mold elements into and away from the loading station;

FIGURE 14 is a view, partly in section, taken on the line 14—14 of FIGURE 13;

FIGURE 15 is a view taken on the line 15—15 of FIGURE 13;

FIGURE 16 is a view similar to that of FIGURE 15, but disclosing certain of the parts of the apparatus in another stage of operation;

FIGURE 17 is a plan view of a circular cam plate which is disposed adjacent the top of the apparatus for purposes which will be later described;

FIGURE 18 is a sectional view taken on the line 18—18 of FIGURE 17;

FIGURE 19 is a fragmentary view, on an enlarged scale and taken on the line 19—19 of FIGURE 18; and FIGURE 20 is a wiring diagram.

Figure 1:
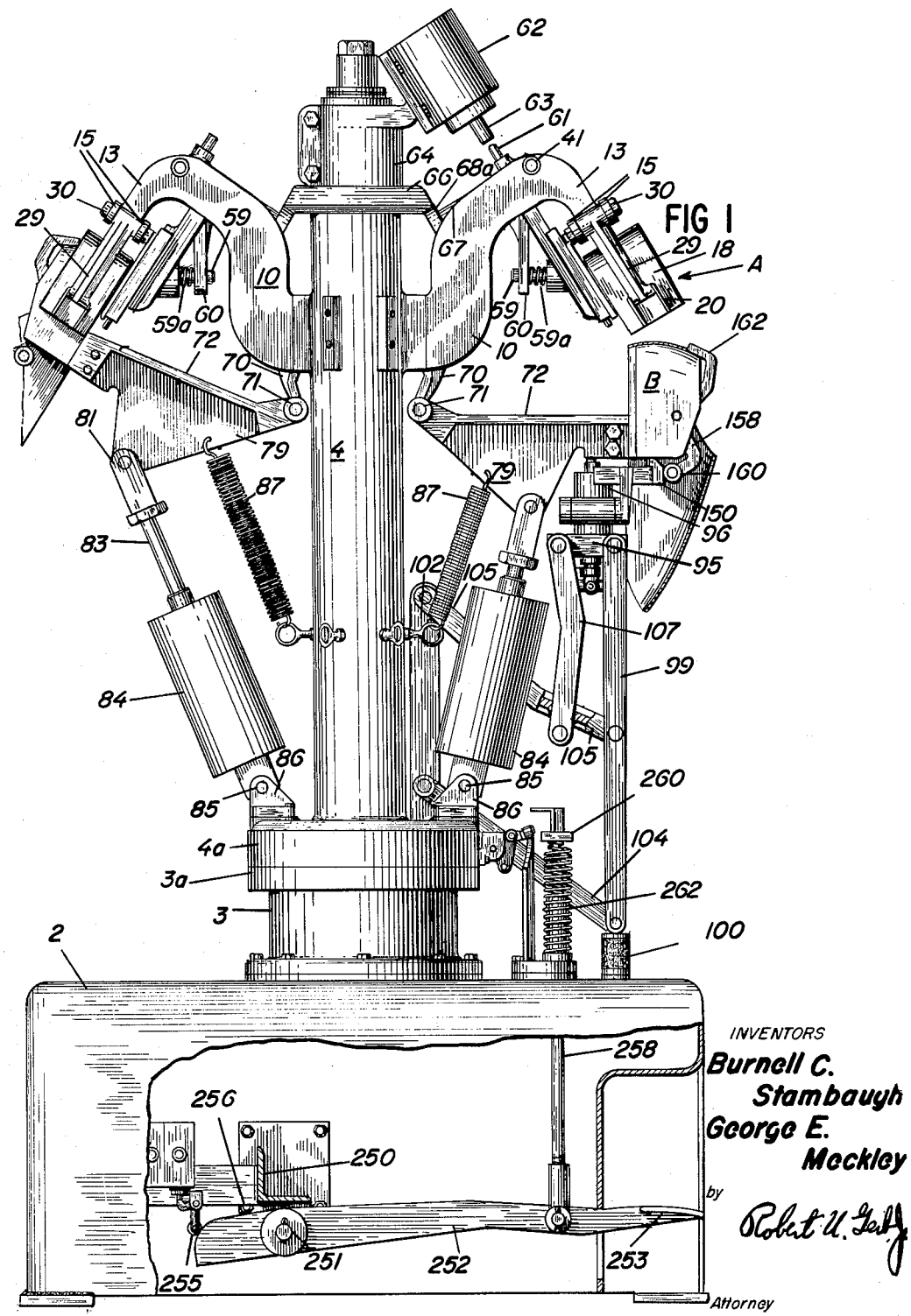
FIGURE 1 is an elevational view of an apparatus which has been constructed in accordance with the teachings of the present invention, the lower portion thereof being broken away to illustrate a portion of one of several of the control devices.

Referring now more particularly to the drawings, the apparatus of the present invention is shown, in FIGURE 1, as comprising a lower rectangular housing or base member 2 to the top of which there is secured a considerably smaller cylindrical housing 3 having an upper radial flange 3a. Mounted atop the cylindrical housing 3 is a vertical tube or standard 4, the lower end of which is provided with a radial flange 4a which rests upon and slidably engages the upper surface of the radial flange 3a.

The rotatably mounted vertical tube or standard 4 carries adjacent its upper end a series of radially extending, evenly spaced, hangers 10, which are bifurcated as shown, six of said hangers being employed in the illustrative embodiment.

The outer mold element

The outer end of each of these evenly spaced radially extending hangers 10 is downwardly directed, as shown at 13, and carries a transversely extending cross-head 15 which may, if desired, take the form of a pair of spaced parallel strips. Each of these cross-heads 15 supports one of the outer mold elements of the appartus, the latter being designated at A. More specifically, each outer mold element comprises an inverted U-shaped sheet-metal shell 18 which is provided on its sides with ears 19 carrying pins 20. An adjustable-length rod 29 is pivotally connected at one end to each of the pins 20, the upper ends of the said links extending upwardly and divergently and pivotally connected to pins or bolts 30 which are carried by, and extend transversely of, the cross-head 15.

Referring to FIGURES 7 and 9, the upper end of each of the inverted U-shaped sheet-metal shells 18 is provided with a vertically extending tab 32 having a vertically elongated slot receiving a pin 33 which extends transversely of and is secured to the central portion of the adjacent cross-head 15.

As shown in FIGURE 7, on either side of the central portion of the cross-head 15 there is a vertically extending link 34 which is secured thereto, the upper end of each of the said links being provided with an inwardly extending flange 36. The inner ends of these inwardly extending flanges 36 are aligned but terminate in spaced relationship and are connected by a short plate 37 which may be bolted or welded in position.

A coil spring 38 is positioned with its upper end against the underside of the short plate 37 and its lower end in contact with the upper end of the vertically extending tab 32 atop the central portion of the inverted U-shaped sheet-metal shell 18 of the outer mold element A. Centrally disposed in the coil spring 38 is a guide rod 38a the upper end of which is welded to the underside of the short metal plate 37. The lower end of the guide rod 38a is secured to a spacing block 38b which is disposed in the central portion of the cross-head 15 and adapted for vertical movement with respect thereto.

According to the foregoing construction and arrangement, the spring 38 absorbs the impact of the inner mold element B as it moves upwardly into the outer mold element A; and it also serves to open the outer mold element A when the inner mold element and the molded shoe upper are withdrawn therefrom.

As shown most clearly in FIGURES 7 and 9 the inverted U-shaped sheet-metal shell 18 of the outer mold element A is provided with a liner 39, the molding surface of which is shaped for cooperation with the said inner mold element B. We have found that molded Teflon serves very satisfactorily as a lining material particularly when its outer surfaces which contact the interior of the inverted U-shaped sheet-metal shell 18 are coated with Plasticol, which is a soft rubber. The pressure of the spring 38 against the back of the inverted U-shaped outer mold element A urges it downwardly which spreads its leading edges outwardly thus creating an open condition to receive the next molding task.

The wiping mechanism

Associated with each of the outer mold elements A, and carried by its supporting arm 10, is the novel wiping means of the apparatus which, as stated earlier herein, functions to fold the projetcing portion of the heel of the shoe upper blank inwardly against the bottom of the corresponding portion of the inner mold element B after the latter has been elevated into molding position.

Referring to FIGURES 2 and 8, the numeral 40 designates a downwardly depending bracket which at its upper end is attached to a bushing 42 which is rotatably mounted on a pin 41 extending across the bifurcations of the upper portion of each of the radial arms 10. The lower end of each of the brackets 40 bears against a plate forming part of the wiping mechanism to be later described herein. This bushing 42 that carries the bracket 40 has a rearward extension which supports a pair of parallel, vertically extending adjustably mounted screws 43. A clevis 44 is attached to the lower end of each of these screws, these clevises in turn being pivotally connected to the upper end of an aligned link 45 (see particularly FIGURES 1 and 8).

The lower ends of these parallel links 45 are pivotally connected to a pair of generally transverse inwardly extending arms 46, the latter being reversely curved with respect to each other. These reversely curved arms 46 lie immediately behind a gib 48 which has a centrally-disposed cylindrical aperture 48b (see FIG. 10); and immediately in front of the gib 48 is a shuttle plate 50. This shuttle plate 50 has a centrally disposed cylindrical aperture 51 which is aligned with the centrally disposed cylindrical aperture of the gib 48; and the lower portion of the centrally-disposed cylindrical aperture of the shuttle plate 50 is open and in communication with a large gate 53 which is formed therein by downwardly and divergently extending sidewalls that continue to the bottom of the shuttle plate. This shuttle plate 50 rides in vertical ways 48a on the gib 48; and is resiliently suspended from the bushing 42 (rotatably mounted on the pin 41) by means of a pair of parallel coil springs 54 (see FIGURES 11 and 12). Immediately in front of the shuttle plate 50 are the curved wiping blades 55 which directly contact the aforementioned projecting portion of the shoe upper blank. Each of these wiping blades is provided on its outer edge with a boss 56 which receives a conventional electrical heating element.

Rotatably disposed in both the centrally-disposed cylindrical aperture of the gib 48 and the centrally-disposed cylindrical aperture of the immediately adjacent shuttle plate 50 is a two-piece segment of a cylindrical plug, the same being generally indicated at 57. The back of each of the segments of the two-piece plug 57 is secured by screws 58 extending through the centrally-disposed cylindrical aperture of the gib 48 to one of the inwardly extending arms 46, the said arms, as previously stated, being reversely curved with respect to each other. The front face of each of the segments of the two-piece plug 57 is secured by the same screws 58 to the upper end of one of the curved wiping blades 55 (see FIGURES 8, 11, and 12). Thus, the two-piece segmental cylindrical plug 57, being rotatably mounted on the gib 48 and shuttle plate 50, will move downwardly with the shuttle plate 50 and, through the screws 58, will impart this downward tendency to the wiping blades 55. The tendency of the downward motion of the two-piece segmental cylindrical plug 57 is also imparted by the screws 58 to the inwardly extending pair of reversely curved arms 46. However, these curved arms 46 are pivotally attached at their other ends to the vertically extending links 45. As may be observed by referring to FIGS. 10, 11 and 12, downward movement of the two-piece segmental cylindrical plug 57 is inhibited; since the links 45 will not admit of any directly vertical motion. In view of the fact that each of the vertically extending links 45 is pivotally attached to a clevis 44, rotational movement of the links 45 is precluded; but such movement is imparted to the inwardly extending reversely curved arms 46, from the latter to the screws 58 and finally from the screws 58 to the curved wiping blades 55.

Referring to FIGURE 2, it will be observed that the wiping mechanism is disposed rearwardly of, but closely adjacent to, the back of the particular outer mold element A with which it is associated. The amount of travel of the wiping mechanism and the relative amount of pressure it exerts is adjustably maintained by an adjusting screw 59 which extends through a pressure plate 60 depending from the pivot pin 41 and making contact with the back of the shuttle plate 50. Sufficient travel must be provided on the adjustable screw 59 to permit the wiping blades 55 to swing upwardly the necessary distance for contact with the shoe upper blank and the underside of the inner mold element which will be shortly described. Excessive travel between the pressure plate 60 and the shuttle plate 50 is prevented by the screw 59 for such occasions when no shoe upper blank is in place. A coil spring 60a is disposed between the pressure plate 60 and the back of the shuttle plate 50 for imparting resiliency to the relationship.

Connected to the mid-portion of the shuttle plate 50 of the wiping mechanism is a vertically extending short stud 61 which is reciprocally mounted in a suitable bushing carried by the most adjacent portion of the supporting hanger 10 and at the operator's station an inverted elevated fluid cylinder 62 is so disposed that its operating rod 63 is in alignment with this short stud 61. This fluid cylinder 62 is supported by an overhead collar 64 secured to a stationary tube 65 which is concentrically disposed within the vertical rotatably mounted tube 4. When the fluid cylinder 62 is actuated its operating rod 63 contacts and depresses the short stud 61 thereby moving the shuttle plate 50 in the same direction, the effect of which was earlier described. The position of the elements illustrated in FIGURE 8 is the normal open position of the wiping blades 55.

Springs 54 cause the wiping blades 55 to be returned to the open position by moving shuttle plate 50 to an upward position. This can only be accomplished when the cam follower 68a enters the recess in the cup-shaped cam ring 66 which will relieve the pressure of the wiping blades 55 against the lower side of the inner mold, thus allowing the springs 54 to retract the shuttle assembly. The rod 63 retracts after it has depressed the short stud 61, the latter remaining in the depressed position until the recess in the inverted cup-shaped cam ring 66 is encountered. The retraction of the rod 63 permits the indexing of the upper portion of the molding machine.

The bottom of the aforementioned overhead collar 64 carries an inverted cup-shaped cam ring 66, the peripheral portion of which is uniform throughout except for a recess 66a which is midway between the operator's station and the immediately preceding station of the machine.

Referring to FIG. 2, the upper pivotally mounted end of the pressure plate 60 is provided with an integrally formed inwardly extending arm 67 which carries a rotatably mounted cam follower 68a for contacting the inverted cup-shaped cam ring 66. It will be observed that when the cam follower 68a moves upwardly into the recess 66a the inwardly extending arm 67 which is integrally formed with the pressure plate 60 will rock about the pivot pin 41 and through the downwardly extending pressure plate 60 will carry the entire wiping mechanism away from the upper outer mold element A. In this way there will be created a space between the wiping blade 56 and the back of the outer mold element A to relieve pressure exerted by the wiping blades 55 against the inner mold element B, thus allowing a coil spring 87 (to be later described) to return the inner mold element B to an unloading and loading position.

Referring to FIGURE 1, a stationary link 70 depends from the inner portion of each of the radially extending arms 10; and carries a pin 71 for pivotally supporting a plate 72 which extends in a generally radial direction with respect to the vertically mounted rotatable tube 4.

*The inner mold element*

One of the inner mold elements B of the apparatus is secured to the outer end of each of the pivotally mounted plates 72. Each of these inner mold elements B is suitably contoured and provided with an internally disposed electrical heating element in the manner well-known in the art; and they are adapted to be successively swung upwardly by their respective pivotally mounted carrying plates 72 into position within the cooperating outer mold element A which is disposed immediately thereabove. Toward this end, each of the pivotally mounted and radially extending plates 72 has a longitudinally extending depending flange 79, the intermediate portion of which carries a pivotally mounted clevis 81. This clevis 81 is secured to the outer end of the operating rod 83 of a fluid cylinder 84, the lower end of the latter being pivotally connected, as at 85, to ears 86 mounted on the upper surface of the flange 4a at the bottom of the vertical rotatably mounted tube 4.

As will be observed, an intermediate coil spring 87 connects the flange 79 of each of the pivotally mounted plates 72 with the rotatably mounted tube 4 in order to return it to its horizontal position upon the deactivation of its fluid cylinder 84 and relief of wiping blade pressure as cam follower 68a passes through the recesses in the inverted cup-shaped cam ring 66.

*The blank gripping mechanism*

At the right-hand side of FIGURE 1 there is shown part of the mechanism, at the operator's station, for gripping the shoe upper blank after the operator has properly placed it on the inner mold element B; the said mechanism serving to maintain the blank in proper position during the upward movement of the inner mold element into the outer mold element A. As shown most clearly in FIGURE 6, this blank gripping mechanism comprises a horizontally positioned generally rectangular block 95 with a centrally disposed integrally formed vertically extending cylinder 96. The outer ends of the rectangular block 95 are supported by a pair of depending and pivotally connected elongate links 99, the lower ends of which are connected together and rest on a resilient stop 100 mounted atop the lower rectangular housing or base member 2.

At either side of the operator's station, and just outside the area circumscribed by the series of vertically and outwardly extending fluid cylinders 84 there is a relatively short, vertically extending stationary post 102. These two stationary posts 102 are connected to the vertically extending elongate links 99 by lower and upper outwardly-bowed cross-links 104 and 105 respectively. A pair of vertically extending links 107 connects the inner ends of the horizontally positioned rectangular block 95 with the mid-portion of the upper outwardly-bowed cross-link 105.

The rectangular block 95 and the aforementioned linkage system connected therewith are capable of upward and downward movement, and are in the lowermost position at the time the operator positions each shoe upper blank upon one of the inner mold elements B, preparatory to the raising of the latter into the upwardly disposed outer mold element A.

Within the vertically extending cylinder 96 of the block 95 there is a hollow floating piston 110 which is closed at the top and receives a piston 112 provided with a piston rod 113 which extends through, and projects from, a centrally apertured closure plug 115 removably disposed in the bottom of said hollow floating piston. Between the bottom of the piston 112 and the closure plug 115 (at the bottom of the hollow floating piston 110) there is a relatively light coil spring 117 which resiliently influences the piston 112 upwardly.

The top of the cylinder 96 is closed except for a central aperture through which a vertical rod 120 extends. The lower end of this rod 120 is secured to the top of the hollow floating piston 110 and the upper end thereof projects from the top of the cylinder 96 and carries an annular stop member 122 which is secured thereto.

A coil spring 123, which is heavier than the spring 117 is disposed between the top of the hollow floating piston 110 and the underside of the head of the cylinder 96.

The piston rod 113 is provided with a central bore 124 which extends upwardly through the top of the piston 112 and downwardly to a transversely extending port 125 which is suitably connected to a source of compressed air. Accordingly, the introduction of compressed air through the port 125 and bore 124 moves the piston 112 downwardly with respect to the hollow floating piston 110 and against the opposing effect of the relatively light coil spring 117. As the introduction of the compressed air continues it will move the hollow-floating piston 110 upwardly against the resistance of the heavy coil spring 123; and the purpose of this will be later described.

The lower end of the piston rod 113 is transversely apertured (see FIG. 3) and carries a pin 128 which pivotally supports the midsection of a cross-link 130 whose opposite ends are pivotally connected to a pair of relatively short vertically extending rods 132 and 134. At each side of the rectangular block 95 a horizontally extending shaft is journaled, as shown at 138 and 140; and each of these horizontally extending shafts pivotally supports the intermediate portion of a bell-crank. These parallel and oppositely disposed bell-cranks are indicated at 142 and 144 respectively, and each of them has an arm which extends substantially horizontally and is pivotally connected at its outer end to one of the vertically extending rods 132 and 134, respectively. The other and right-angularly disposed arm of each of the bell-cranks 142 and 144 extends in a substantially vertical direction and each of them carries a transversely extending gripping member or strip 146. Accordingly, these gripping members or strips 146 extend horizontally and they are adapted to contact the opposite sides of the vertically disposed shoe upper blank and press them against a horizontally extending U-shaped bracket 150 which is below the heel end form of the inner mold element B and in close relationship to the interior of a shoe upper blank which has been placed on said inner mold element by the operator. Thus, the exterior of the material of the shoe upper blank will be gripped by the gripping members or strips 146 and at the same time the upper end of the rod 120 will be pushed by the hollow floating piston 110 into contact with the underside of the outer end of the pivotally mounted plate 72 carrying (the inner mold element B) and raising it, thereby producing a stretching effect on the shoe upper blank.

*The means for gaging the position of the blank on the inner mold element*

Referring to FIGURES 3 and 4, the outer face of the horizontally extending U-shaped bracket 150 opposite the gripping members 146 carries a vertical guide member having a lower vertically extending flat surface 152 and an upper flat surface 154 which extends rearwarly, i.e. toward the rectangular block 95.

The upper portion of the inner mold element or heel end from B, as viewed in FIGURE 3, carries a horizontally extending pin 156 which pivotally supports the central portion of a vertically extending rockable lever 158. The lower end of this rockable lever 158 extends inwardly toward the rectangular block 95 and carries a roller 160 for making contact with the lower and upper flat surfaces 152 and 154, respectively, of the vertical guide member on the outer end of the horizontally extending bracket 150. The upper end of the vertically extending rockable lever 158 projects outwardly of the inner mold element B and is provided with a reentrant portion 162 which is adapted to be swung into and out of engagement with the outer central area of the rearmost heel section of the inner mold element B. The extremity of the reentrant portion 162 of the rockable lever 158 serves as a removable stop or gage for assisting the operator in properly positioning the shoe upper blank on the heel end form or inner mold element. As shown at the upper portion of FIGURE 3, a coil spring 164 resiliently influences the upper end of the rockable lever 158 into its outward position. According to this arrangement, the downward movement of the rectangular block 95, with its bell-cranks 142 and 144 and the gripping members 146 carried thereby, will permit the roller 160 on the lower end of the rockable lever 158 to move along the rearwardly inclined upper surface 154 of the vertical guide member and thereby cause the spring 164 to move the upper reentrant portion 162 of the rockable lever 158 outwardly to a position which will not interfere with the interfitting of the outer mold element A and the inner mold element B. This retractive movement of the upper end 162 of the rockable lever 158 produced by the aforementioned movement of the roller 160 takes place immediately after the rectangular block 95 has reached the peak of its upward movement and is released to drop downwardly by gravity and thereby become dissociated with the inner mold element B which is now in the outer mold element A.

After the operator of the apparatus has properly positioned the shoe upper blank on the inner mold element or heel end form B, the latter moved upwardly into the outer mold element A, and the rectangular block 95 with its gripping members 146, etc., permitted to drop downwardly, the vertical tube 4 is partially rotated to bring to the operator's station the next or succeeding pair of mold elements A and B for the application thereto of the next shoe upper blank. As this operation is continued, the first blank that was applied by the operator arrives at the operator's station; and after separation of the inner and outer mold elements is manually removed by the operator after which the previously described cycle is repeated.

According to the embodiment described herein and illustrated in the drawings, each associated pair of outer and inner mold elements A and B with its intermediately disposed shoe upper blank moves in a complete circle during the molding operation; but in increments of 60 degrees; and at the end of each 60-degree increment the operator removes a completely molded shoe upper from the inner mold element B which has now been lowered to its initial position. Immediately thereafter, the operator places an unmolded shoe upper blank upon the same inner mold element B preparatory to its commencing the same cycle as has just been previously described.

*The indexing mechanism*

In FIGURES 13 through 16 of the drawings there is shown means by which the aforementioned rotative movement may be accomplished, the same comprising an indexing ring 170 which is disposed within the lower rectangular housing 2 and is secured to the rotatable vertical tube 4. This indexing ring 170 is provided with a series of evenly spaced peripheral indentations or slots 172 corresponding in number to the number of molding units of the apparatus.

Below the indexing ring 170 there is a rotary air motor 174 with its shaft 176 extending vertically and in axial alignment with the rotatably mounted vertical tube 4. Secured to the vertically extending shaft 176 of the rotary air motor 174 is a collar 178 carrying a radially extending turning arm 180, the outer end of which supports a vertically extending post 182. A laterally extending lever 186 is pivotally connected to the upper end of the vertically extending post 182 and is provided adjacent its outer end with a pawl 190 which extends inwardly toward the axis of the rotatably mounted vertical tube 4 and is adapted to successively seat within each of the peripheral slots 172 in the indexing ring 170. The slots 172 are tapered and the pawl 190 contacts both sides thereof whereby the indexing ring 170 is securely located and held in exact position by the pawl. The pawl 190 is not only used to index the machine, but also serves as a brake to bring the indexing motion to rest when the complete stroke has been made.

A fluid cylinder 194 is pivotally connected, as at 195, to an ear 191 which is integrally formed with the collar 178 on the shaft 176 of the rotary air motor 174. The actuating rod 198 attached to the piston of this fluid cylinder 194 is pivotally connected to a boss 199 on the underside of the laterally extending lever 186 adjacent to its outer end and below the pawl 190. Accordingly, the introduction of fluid (i.e., compressed air) to the inner end of the fluid cylinder 194 will move its actuating rod 198 outwardly, and through the lever 186, move the pawl outwardly and thus out of engagement with the indexing ring 170. When compressed air is introduced to the outer end of the fluid cylinder 194, the movement of the pawl 190 is reversed and therefore pulled into one of the peripheral slots 172 of the indexing ring. It is in this position, of course, that the 60-degree rotative movement of the mold elements is effected.

Disposed concentrically around the indexing ring is a collar 200 having a wide peripheral opening or gap 201; and as shown in FIGURES 15 and 16, this collar 200 carries an adjustable stop 203 for preventing the excessive return, or counterclockwise, movement of the radially extending turning arm 180. This stop 203 must, of course, be so adjusted that the shaft 176 of the rotary air motor 174 rotates exactly 60 degrees as the latching means (i.e., pawl 190, etc.) closes.

Referring to the bottom of FIGURE 1, a hanger 250 is mounted within the rectangular or base housing 2 and carries a horizontal shaft 251 which pivotally supports a treadle 252 extends outwardly and into a recess in the front of the base housing 2 adjacent the operator's station and is provided with a foot pedal 253.

Pivotally connected to the treadle 252 adjacent its outer end is a vertically extending shaft 258, the upper end of which extends through and projects from the top of the base housing and carries a keeper 260 in spaced relationship thereabove. A coil spring mechanism 262 is disposed between the keeper 260 and the top of the base housing. This coil spring mechanism 262 comprises two distinct and separate springs and when the foot pedal 253 is depressed for a certain distance the operator can feel the pressure from its first of these springs. This operation actuates a switch which results in the introduction of compressed air to the fluid cylinder 96 of the previously described gripping mechanism. When contact with the second spring is made, additional pressure will be felt, after which a second switch is contacted which actuates the fluid cylinder 84 for moving the inner mold element to a forming position.

It will be understood by those skilled in the art that control instrumentalities for actuating the component elements of the apparatus of the present invention are readily available—such as limit switches, relays, solenoid-operated valves for the fluid cylinders, etc.—and that the same may be expediently coordinated by electrical circuitry which is entirely conventional. Accordingly, the circuit and diagrammatic showings of FIGURE 20 are for purposes of illustration only.

Operation (1) The operator places the shoe upper blank on the inner mold element B and lightly depresses the pedal 253 on the outer end of the treadle 252, which closes a limit switch LS1 positioned adjacent the inner end of the treadle. The closing of this limit switch LS1 effects the introduction of compressed air to the pneumatic system (i.e., cylinder 96, etc.) for the gripping mechanism, thus causing the gripping members or strips 146 to grip the blank and pull it downwardly with respect to the inner mold element B. If the shoe upper blank is not in proper position the operator simply relieves the pressure on the foot pedal until the necessary adjustment is made.

(2) When the operator is satisfied that the shoe upper blank is in proper position, he further depresses the pedal 253, thus causing the tripping of a limit switch LS2 which, like the limit switch LS1, is also positioned adjacent the inner end of the treadle 252. This locks the gripping members 146 through a relay; and also actuates a mechanical valve to admit compressed air to the immediately adjacent fluid cylinder 84 which then swings the inner mold element B upwardly into the outer mold element A. The upwardly applied pressure against the outer mold element A automatically closes it against the inner mold element, thus holding the blank firmly in place.

(3) From this point onward, the operation of the apparatus becomes automatic. Two hand control buttons are provided, one on either side of the machine, and upon which one of the operator's hands must rest during the entire indexing cycle, thus providing increased safety. As the shoe upper blank is being pressed into the outer mold element A in the manner described immediately hereinbefore, the gripping mechanism at the peak of its upward movement strikes a limit switch LS3, which results in the unclamping of the latch (i.e. pawl 190) and introduction of compressed air behind the piston within the overhead cylinder 62. The only time in the operation of the machine during which the wiping blades 55 are not bearing upon the projecting portion of the shoe upper blank is for a very short interval when; (1) the cam follower 68a is in the recess 66a, and (2) the inner mold element B carrying the shoe upper blank is not in the outer mold element A. Accordingly, it is manifest that the limit switch LS3 controlling the overhead cylinder 62 must be so timed that its rod 63 strikes the short stud 61 only when the two immediately aforementioned operating conditions exist. In other words, when the operator is in the act of placing a fresh shoe upper blank upon the inner mold element B.

(4) When the (overhead) cylinder 62 for the wiping mechanism reaches the end of its downward stroke, a switch LS4 is actuated; and this operates a valve to supply compressed air to return the radially extending turning arm 180 of the indexing mechanism to the position shown in FIGURE 16. This also opens a relay which relieves pressure in the pneumatic system of the gripping mechanism (i.e. cylinder 96, etc.) to unclamp the gripping members 146 and permit the gripping mechanism to fall by gravity to the position illustrated in FIGURE 1.

(5) The dropping of the gripping mechanism causes a limit switch LS4 to open and thereby close the valve for supplying compressed air to the cylinder 62 which permits the spring therein to withdraw the piston rod 63.

(6) When the radially extending turning arm 180 of the indexing mechanism has fully returned to its starting position, it closes a limit switch LS5, causing it to operate a valve which closes the turning latch or pawl.

(7) When the pawl 190 engages the indexing ring 190 it actuates a limit switch LS6 controlling a valve which causes the rotary air motor 174 to turn the vertical tube 4 one-sixth of a revolution.

(8) During the turning cycle the cam follower (i.e. roller) 68a enters the recess 66a in the cam ring 66, whereupon the pressure plate 60 partially rotates about the pin 41, thus relieving the pressure between the curved wiping blades 55 and the adjacent surface of the inner mold element B. The relief of the aforementioned pressure permits the spring 54 to retract and open the wiping blades 55. Immediately following the retraction of the wiping blades 55 a cam actuates a mechanical valve to release compressed air from the fluid cylinder 84, which is then approaching the operator's station; thus permitting the spring 87 to retract the inner mold element B to its initial loading position. The finished shoe blank may now be removed by hand, and the apparatus is ready for the next cycle.

It is contemplated that the limit switch LS5 be mounted on the collar 200 adjacent the adjustable stop 203 and actuated by direct contact with the radially extending turning arm 180; and that the limit switch LS6 be mounted on the pawl-carrying lever 186 for actuation by direct contact with a stationarily mounted adjustable screw (not shown) as said lever brings the pawl into engagement with the appropriate slot 172 in the indexing ring 170.

For the return or counterclockwise movement of the latching means (i.e. pawl 190, etc.) to the position of FIG. 1, a three-way valve may be used where the supplied air comes through a pressure control at low pressure. The reason for keeping the pressure low is twofold: first, to prevent the pawl-carrying lever 186 from striking the stop 203 at high speed, and secondly, to conserve air since only a few pounds are needed to return the indexing mechanism shown and described in the present embodiment.

When the radially extending turning arm 180 has fully returned to its starting position and strikes the adjustable stop 203, the adjacently disposed switch LS4 operates the valve which closes the turning latch, or pawl.

Referring to FIGURE 15, as the pawl-carrying lever 186 brings the pawl 190 into engagement with the appropriate slot or recess 172 in the indexing ring 170 the limit LS6 strikes the adjustable screw previously mentioned, thereby making contact and this (1) Turns off the flow of low pressure air to the rotary air motor 174 which makes it turn counterclockwise, and (2) Opens a second three-way valve to introduce high pressure air to rotate the vertical tube 4 and the instrumentalities supported thereby for one-sixth of a revolution, in a clockwise direction. This three-way valve is controlled by one of the two hand control buttons earlier referred to.

It will be noted that all of the return strokes of the apparatus shown and described herein are accomplished by springs which results in substantial reduction of the consumption of compressed air.

While we have shown and described certain specific embodiments of the present invention, it will be readily understood by those skilled in the art that we do not wish to be limited exactly thereto, since various modifications may be made without departing from the scope of the invention as defined in the appended claims.

We claim:

1. In a machine for molding shoe uppers; a substantially vertically disposed inverted U-shaped outer mold assembly; a substantially vertically extending inner mold assembly including a heel end form; said inner mold assembly being disposed below said outer mold assembly with the back of its heel end form uppermost; a turntable mounting said outer mold assembly and said inner mold assembly; a carriage on said turntable for moving said inner mold assembly upwardly into said inverted U-shaped outer mold assembly; a carrier mounted on said turntable and disposed rearwardly of said inverted U-shaped outer mold assembly and adjacent the bottom marginal area of said heel end form when said mold assemblies are united; wiping blades on said carrier; means on said carrier for moving said wiping blades over the bottom marginal area of said heel end form; means operable to effect incremental rotation of said turntable from a loading station and return; pressure-operated means at said loading station for operating the means on said carrier for moving said wiping blades in the manner aforesaid.

2. The combination of claim 1, together with means for heating said wiping blades.

3. The combination of claim 1, together with means for heating the heel end form of said inner mold assembly.

4. The combination of claim 1, together with means for heating said wiping blades; and means for heating the heel end form of said inner mold assembly.

5. In a machine for molding shoe uppers; a substantially vertically disposed inverted U-shaped outer mold assembly; a substantially vertically extending inner mold assembly including a heel end form; said inner mold assembly being disposed below said outer mold assembly with the back of its heel end form uppermost; a turntable mounting said outer mold assembly and said inner mold assembly; a carriage on said turntable for moving said inner mold assembly upwardly into said inverted U-shaped outer mold assembly; means on said turntable and associated with said inner mold assembly for holding a shaped shoe upper blank with a portion of its bottom marginal area projecting beyond the corresponding portion of said heel end form; a carrier mounted on said turntable and disposed rearwardly of said inverted U-shaped outer mold assembly and adjacent the bottom marginal area of said heel end form when said mold assemblies are united; wiping blades on said carrier; means on said carrier for moving said wiping blades over the bottom marginal area of said heel end form; means operable to effect incremental rotation of said turntable from a loading station and return; pressure-operated means at said loading station for operating the means on said carrier for moving said wiping blades in the manner aforesaid.

6. The combination of claim 5, together with means for heating said wiping blades.

7. The combination of claim 5, together with means for heating the heel end form of said inner mold assembly.

8. The combination of claim 5, together with means for heating said wiping blades; and means for heating the heel end form of said inner mold assembly.

9. In an apparatus for molding a shoe upper blank, including an outer mold element and an inner mold element; means for wiping a portion of the shoe upper blank which projects beyond said mold elements; said wiping means including a cylindrically apertured plate-like shuttle; a plate-like gib having a cylindrical aperture adapted for alignment with the central aperture of said plate-like shuttle; a two-piece segmental plug extending between and disposed for rotative movement in the cylindrical apertures in said shuttle and said gib; an inwardly extending arm secured to each of the segments of said plug; said arms reversely curved with respect to each other; a wiping blade secured to each of said inwardly extending reversely curved arms; said wiping blades being disposed in opposed parallelism with respect to each other and with their inner surfaces concavely curved; means for resiliently influencing said plate-like shuttle toward said mold elements; and means for imparting rotative movement to the segments of said plug whereby said wiping blades move toward each other and fold the aforementioned projecting portion of the shoe upper blank inwardly over the adjacent portions of the inner mold element.

10. The combination of claim 9, together with means for heating said wiping blades.

11. In an apparatus for molding a shoe upper blank including an outer mold element and a relatively movable inner mold element; means for gripping and stretching that portion of the shoe upper blank which is positioned over said inner mold element; said means comprising a block disposed adjacent said inner mold element and adapted for movement therewith; a pair of opposed bell-cranks carried by said block; one arm of each of said bell-cranks being adapted for rocking movement toward and away from said inner mold element; each of said arms carrying a member for engaging said shoe upper blank and forcing it against said inner mold element; a fluid cylinder carried by said block; a piston disposed in said cylinder; a piston rod secured to said piston;

means actuated by said piston rod for rocking said bell-cranks; means for pulling said bell-cranks and the associated blank-contacting members along said inner mold element to thereby produce a stretching effect; and means carried by said block for gaging the innermost position of said shoe upper blank with respect to said inner mold element.

References Cited by the Examiner

UNITED STATES PATENTS

| | | | |
|---|---|---|---|
| 2,255,000 | 9/1941 | Haber et al. | 12—12.5 |
| 2,271,682 | 2/1942 | Dodge | 12—54.3 |
| 2,305,689 | 12/1942 | Gross et al. | 12—54.3 |
| 2,719,992 | 10/1955 | Macdonald | 12—53.5 |
| 2,983,934 | 5/1961 | Bertrand | 12—53.5 X |
| 3,007,182 | 11/1961 | Lauretti | 12—53.5 |
| 3,105,250 | 10/1963 | Kamborian et al. | 12—54.3 |

JORDAN FRANKLIN, *Primary Examiner.*